(12) United States Patent
Troy et al.

(10) Patent No.: US 10,127,792 B1
(45) Date of Patent: Nov. 13, 2018

(54) SAFETY SYSTEM FOR OPERATIONS HAVING A WORKING FIELD ON AN OPPOSITE SIDE OF A BARRIER FROM A DEVICE

(71) Applicant: The Boeing Company, Chicago, IL (US)

(72) Inventors: James J. Troy, Issaquah, WA (US); Gary E. Georgeson, Tacoma, WA (US); Scott W. Lea, Renton, WA (US); Daniel J. Wright, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/593,520

(22) Filed: May 12, 2017

(51) Int. Cl.
G08B 21/18 (2006.01)
H04W 4/02 (2018.01)
H04L 12/24 (2006.01)
H04B 17/318 (2015.01)
H04W 4/70 (2018.01)

(52) U.S. Cl.
CPC ......... *G08B 21/182* (2013.01); *H04B 17/318* (2015.01); *H04L 41/0681* (2013.01); *H04W 4/023* (2013.01); *H04W 4/70* (2018.02)

(58) Field of Classification Search
CPC ...... G08B 21/182; H04W 4/70; H04W 4/023; H04B 17/318; H04L 41/068
See application file for complete search history.

(56) References Cited

U.S. PATENT DOCUMENTS

| | | | |
|---|---|---|---|
| 7,194,358 B2 | 3/2007 | Callaghan et al. | |
| 8,935,006 B2* | 1/2015 | Vu | B25J 5/007 700/264 |
| 2005/0141997 A1* | 6/2005 | Rast | F04D 25/088 416/229 R |
| 2012/0327261 A1* | 12/2012 | Tafazoli Bilandi | E02F 9/24 348/222.1 |
| 2016/0188977 A1* | 6/2016 | Kearns | G06K 9/00664 348/113 |
| 2017/0100838 A1 | 4/2017 | Lewis | |
| 2017/0206756 A1* | 7/2017 | Bastidas | G08B 7/06 |

* cited by examiner

*Primary Examiner* — Nader Bolourchi
(74) *Attorney, Agent, or Firm* — McDonnell Boehnen Hulbert & Berghoff LLP (57) ABSTRACT

Systems and methods for increasing situational awareness for a tool operator and an individual approaching a working field of the tool are described. An example method includes activating a first device, where the first device has a working field and has an operational path configured to intersect a barrier. A proximity sensor of the second device then detects a presence of an object in a sensor zone of the second device. The second device transmits a wireless signal to the first device indicating the presence of the object in the sensor zone of the second device. Then at least one of the first device and the second device issues a first alert indicating the presence of the object in the sensor zone of the second device.

20 Claims, 6 Drawing Sheets

SAFETY SYSTEM FOR OPERATIONS HAVING A WORKING FIELD ON AN OPPOSITE SIDE OF A BARRIER FROM A DEVICE

FIELD

The disclosure generally relates to a safety system and, more particularly, to a proximity sensing and alert system and methods to deactivate a first device having an operational path configured to intersect a barrier, and to provide situational awareness to an operator of the first device and to an object near a second device arranged on an opposite side of the barrier in a non-line-of-sight position relative to the first device.

BACKGROUND

In manufacturing environments, passive indicators, such as cones, flags or signage, have been employed to alert individuals on a blind-side of an operation involving a tool with an operational path that may penetrate or pass through a barrier (e.g., airplane skin). Such passive indicators depend upon visual contact from an individual, but when an individual does not perceive the passive indicator the purpose is defeated. For example, an individual may be distracted by a cell phone, caught up in conversation, staring at the ground or stepping backwards. Subsequently, the individual may inadvertently pass into a working field into which the operational path of the tool extends.

SUMMARY

In a first aspect of the disclosure, a method is described that includes activating the first device. The first device has a working field, and the first device has an operational path configured to intersect a barrier. The method further includes detecting, via a proximity sensor of a second device, a presence of an object in a sensor zone of the second device and transmitting, via the second device, a wireless signal to the first device indicating the presence of the object in the sensor zone of the second device. The method also includes issuing a first alert, via at least one of the first device and the second device, indicating the presence of the object in the sensor zone of the second device.

In a second aspect of the disclosure, systems are also disclosed herein. One system includes a first device having a receiver and at least one of a first alert indicator and an override switch. The system also includes at least one second device having a transmitter and a proximity sensor, the proximity sensor configured for communication with the transmitter of the second device, the second device configured to send at least one wireless signal to the receiver of the first device to activate one of the first alert indicator or the override switch in response to the proximity sensor detecting an object within a sensor zone.

Another system includes a first device having a receiver and at least one of a first alert indicator and an override switch. This system further includes a plurality of second devices each having a proximity sensor and a transmitter that is configured for communication with the proximity sensor, the plurality of second devices configured to send at least one wireless signal to the receiver of the first device to activate one of the first alert indicator or the override switch in response to at least one of the plurality of second devices detecting an object within a sensor zone of the at least one of the plurality of second devices, the plurality of second devices are configured to be arranged in a non-line-of-sight position relative to the first device such that the first device and the plurality of second devices are arranged on opposite sides of a barrier.

The features, functions, and advantages that have been discussed can be achieved independently in various examples or may be combined in yet other examples further details of which can be seen with reference to the following description and drawings.

BRIEF DESCRIPTION OF THE DRAWINGS

Examples are described below in conjunction with the appended drawing figures, wherein like reference numerals refer to like elements in the various figures, and wherein.

Corresponding parts are marked with the same reference symbols in all figures.

The drawings are provided for the purpose of illustrating examples, but it is understood that the examples are not limited to the arrangements and instrumentalities shown in the drawings.

DETAILED DESCRIPTION

Figure 1:
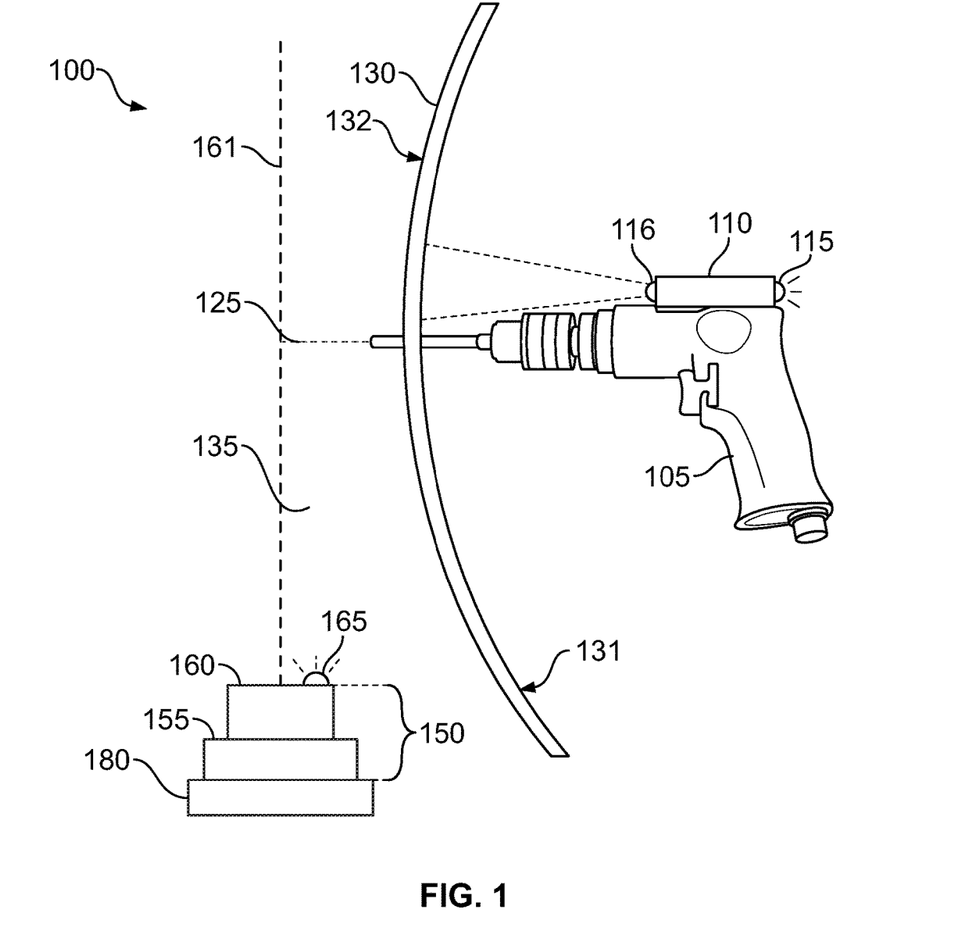
FIG. 1 is a diagrammatic representation of a side view of a system, according to one example implementation.
Figure 2:
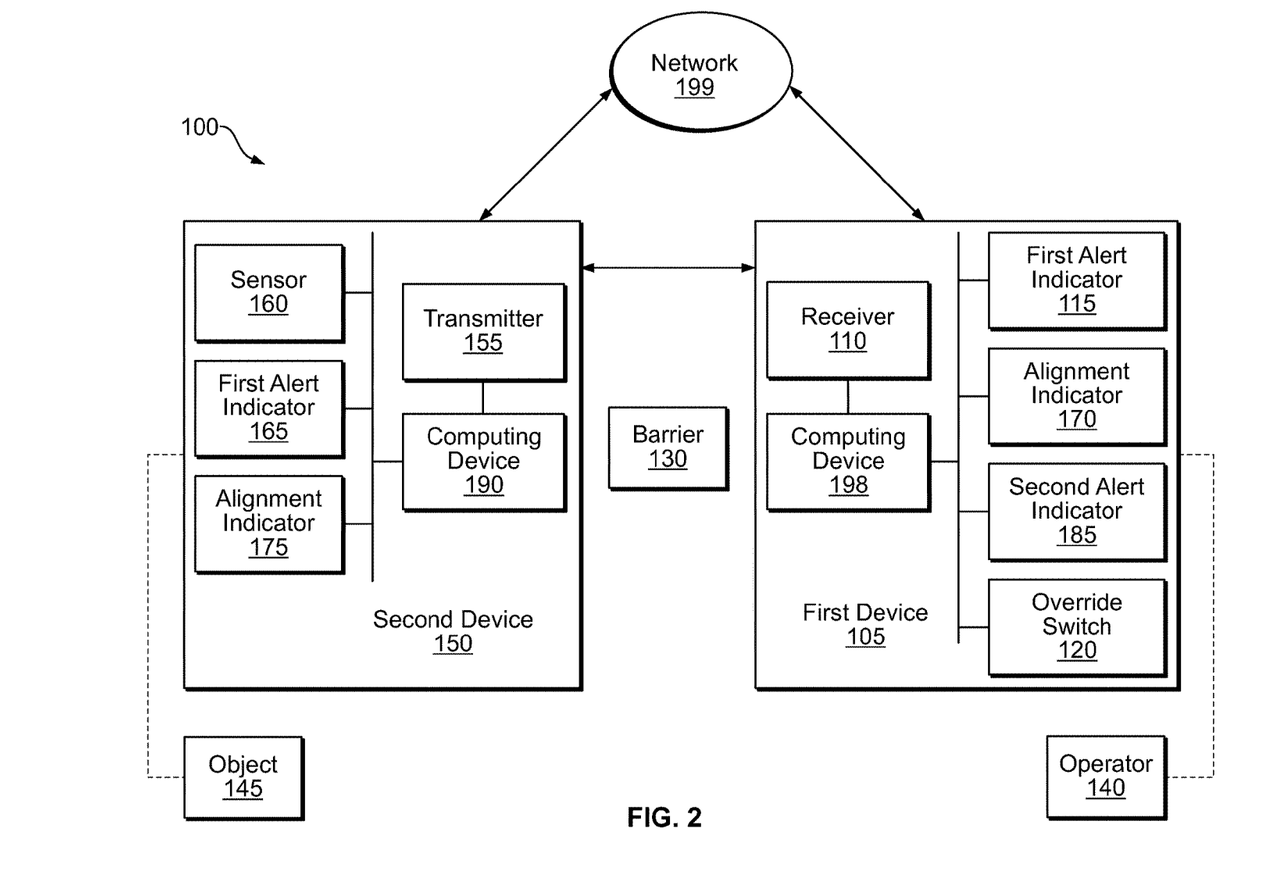
FIG. 2 is a functional block diagram of the system of FIG. 1, according to an example implementation.

The disclosed examples provide safety systems and methods for increasing situational awareness for a tool operator and an object approaching a working field of a first device. The systems and methods also beneficially provide the ability to alert the operator and to deactivate the tool without operator intervention, in some examples. In further examples, the systems and methods may further notify individuals that they are in proximity to the working field of the device. The systems and methods also provide an advantage of being reconfigurable FIGS. 1 and 2 depict a system 100 that includes a first device 105 having a receiver 110 and at least one of a first alert indicator 115 and an override switch 120. The receiver 110 may take the form of a transceiver, as described in more detail below. The first device 105 has an operational path 125 configured to intersect a barrier 130 such that a portion of the first device 105 (e.g. drill bit or saw blade) or an output (e.g., nail, laser or flame) of the first device 105 may pass through or penetrate one side 131 of the barrier 130 and enter a working field 135 of the first device 105 on an opposite side 132 of the barrier 130. In other words, the operational path 125 of the first device 105 includes the route or footprint that the first device 105 and any output of the first device 105 follows during operation. As such, the working field 135 of the first device 105 includes the space into which the operational path 125 may extend from the side 132 of the barrier 130 opposite to the first device 105.

The first device 105 may include, but is not limited to a drill (shown in FIG. 1), a saw, a nail gun, a sander, a blow torch, a laser and other power-cutting or portable tools. Further, the barrier 130 may be any object that creates a non-line-of-sight or blind-side operation that obstructs the view of a tool operator 140 thereby preventing observation of objects 145, including individuals, on the opposite side 132 of the barrier 130. Example barriers 130 include, but are not limited to, an airplane skin or a wing, a ship hull or a vehicle panel in manufacturing or maintenance environments and a wall, a roof or a ceiling in a construction zone. Example barriers 130 may also include a mesh or have a plurality of openings or access ports. Other example barriers 130 may include transparent panels that permit visibility but obstruct sound such that an object's auditory perception of an operation may be impaired. The barrier 130 may not create a blind-side operation per se and instead provides a working surface for a tool operator 140, who may become distracted or look away from the operation of the first device 105.

The system 100 also includes at least one second device 150 having a transmitter 155 and a proximity sensor 160. The second device 150 may also include a first alert indicator 165, described in more detail below. The transmitter 155 may take the form of a transceiver, as described in more detail below. As shown in FIG. 1, in operation, the second device 150 is arranged in a non-line-of-sight position relative to the first device 105 such that the first device 105 and the second device 150 are arranged on opposite sides 131, 132 of the barrier 130. As used herein, transceivers are devices that can both transmit and receive wireless communications, such as a combined radio transmitter and receiver that share common circuitry or a common housing. In an optional example in which the first device 105 and the second device 150 each have a transceiver, the transceiver of the first device 105 and the transceiver of the second device 150 are capable of bi-directional wireless communication with each other.

In an alternative implementation, wireless communication (e.g. radio-based communication) between the first device 105 and the second device 150 may not be feasible, for example, in areas that are shielded or where there is a significant amount of radio frequency interference. In this implementation, a wired connection between the first device 105 and the second device 150 may be utilized. The wired connection may be run through a plurality of openings or access ports, for example, in the barrier 130. One advantage of a wired connection is that the wired connection permits power to be supplied to the first device 105 and the second device 150 in place of a battery.

The proximity sensor 160 includes, but is not limited to, one or more of an optical sensor, an infrared sensor, an ultrasonic sensor, a tactile sensor, a capacitive sensor, a laser-based sensor, a through-beam sensor, a contact sensor, a camera-based sensor and a motion sensor. The proximity sensor 160 has a sensor zone 161 that has optional orientations including, but not limited to, overlapping with the working field 135 of the first device 105, establishing a perimeter surrounding the working field 135 (e.g., a light or laser curtain) or extending from the second device 150 in a direction away from the barrier 130 and the working field 135. The proximity sensor 160 is configured for communication with the transmitter 155 of the second device 150. In one example, the transmitter 155 of the second device 150 may be part of the proximity sensor 160 and coupled together in a hard-wired, fiber-optic or electro-mechanical arrangement directly or indirectly. In an alternative, example the proximity sensor 160 and the transmitter 155 of the second device 150 may communicate wirelessly.

The second device 150 of system 100 may include a computing device 190 having one or more processors 191 to receive signals from the proximity sensor 160 and to determine whether to issue a first alert to activate one or more of the first alert indicators 115, 165 and the override switch 120. The computing device 190 may receive signals from the receiver 110 of the first device 105 to determine signal strength for alignment with the second device 150, in one optional example. The computing device 190 is described more fully below with reference to FIG. 10. In alternative implementations, analog electrical components, integrated circuits or microprocessors may be utilized to perform the same functions of the computing device 190. The computing device 190 is communicatively coupled to the proximity sensor 160, the receiver 110, the transmitter 155, the first alert indicators 115, 165, the override switch 120, the alignment indicators 170, 175 and the second alert indicator 185. In one example, the computing device 190 is directly wired to components of the second device 150, including the transmitter 155, proximity sensor 160, the first alert indicator 165 of the second device 150 and alignment indicator 175 and is wirelessly connected to components of the first device 105, including the receiver 110, the first alert indicator 115, the override switch 120, the alignment indicator 170 and the second alert indicator 185. In another example, the computing device 190 is wirelessly connected to the proximity sensor 160, the receiver 110, the transmitter 155, the first alert indicators 115, 165, the override switch 120, the alignment indicators 170, 175 and the second alert indicator 185.

Figure 10:
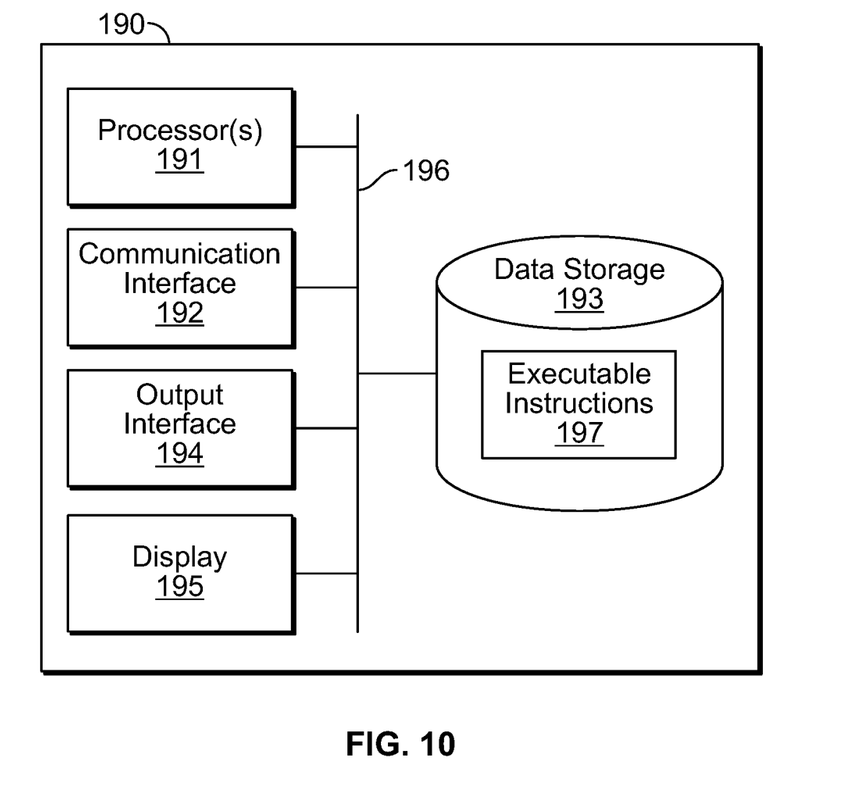
FIG. 10 is a block diagram illustrating an example of a computing device, according to an example implementation.

The second device 150 is configured to send at least one wireless signal to the receiver 110 of the first device 105 to activate one of the first alert indicator 115 or the override switch 120 in response to the proximity sensor 160 detecting an object 145 within a working field 135 of the first device 105. The object 145 includes, but is not limited to, individuals, vehicles or other equipment. In one optional example, shown in FIG. 1, the second device 150 also includes a first alert indicator 165 arranged to alert an object 145 detected by the proximity sensor 160 that the object 145 has entered the sensor zone 161 of the second device 150. In examples, the computing device 190 has one or more processors 191, as shown in FIG. 10, to determine whether to issue a first alert to activate one or more of the first alert indicators 115, 165 and the override switch 120 based on a signal received from the proximity sensor 160 indicating that an object 145 has been detected. The computing device 190 may output the first alert to one or both of the first alert indicators 115, 165 and/or the override switch 120. In order to reduce or avoid injury or damage to the object 145, the first alert indicator 115 is configured to alert an operator 140 of the first device 105 of a detected object 145 and the override switch 120 is configured to stop at least one mode of operation of the first device 105 or to deactivate operation of the first device 105 altogether. For example, the first alert indicator 115 of the first device 105 may be a device that provides visual, audible, or tactile feedback. In various examples, the first alert indicator 115 of the first device 105 includes, but is not limited to, at least one of a light (shown in FIG. 1), an electronic display, an alarm and a vibration controller. In a further optional example, the first alert indicator 115 is a work light 116 (shown in FIG. 1) coupled to the first device 105 that is configured to pulse in response to a signal received from the second device 150. The first alert indicator 165 of the second device 150 may also provide visual, audible, or tactile feedback in the form of at least one of a light, an electronic display, an alarm and a vibration controller.

In one example in which the first device 105 is an electrically-powered tool, the override switch 120 includes software code containing instructions executable by computing device 198 to control hardware in the form of a circuit breaker, relay or electrically operated switch, for example, that is coupled directly to circuitry for an electric motor of the first device 105 through a system of wires. When the override switch 120 is closed, the electricity is permitted to flow freely through the circuit. When the override switch 120 receives a signal from the second device 150 via the receiver 110 from the first device 105, the override switch 120 is responsively opened thereby interrupting the flow of electricity to the motor. Such an arrangement permits the electrically-powered tool to respond in real-time to the actuation of the override switch 120. In another optional example, the override switch 120 may correspond to software configured to execute code to cause the first device 105 to stop operation or operate in a different mode. The software instructions may reside on a server accessible via a network 199 or stored locally on computing device 198. In an alternative example in which the first device 105 is powered pneumatically, the override switch 120 is coupled to one of a pneumatic switch box or in-line with an air hose coupled to the first device 105. In the foregoing example, the override switch 120 takes the form of an air pressure release valve. Under normal operation, the air pressure release valve is closed thereby maintaining air pressurization in the pneumatic system. In response to a signal from the second device 150 received via the receiver 110 from the first device 105, the air pressure release valve opens thus releasing air in the hose to both stop driving the motor of the first device and alleviate stored potential energy from pressurized air in the pneumatic system.

Optionally, at least one of the first device 105 and the second device 150 has an alignment indicator 170, 175 configured to indicate a signal strength of the first device 105 relative to the second device 150. In operation, the first device 105 continuously emits a pilot signal via the receiver 110. As used herein, a pilot signal is a single frequency signal transmitted over a communications system for location purposes. The second device 150 receives the pilot signal and the computing device 190 constantly determines the strength of the pilot signal by measuring the power level of the pilot signal. As the distance between the first device 105 and the second device 150 increases, the signal strength of the pilot signal from the first device 105 decreases and vice versa. The computing device 190 also constantly compares the determined signal strength to a plurality of signal strength thresholds to adjust the alignment indicator 170, 175. Since the materials and thicknesses of barrier 130 may vary, an initial calibration step may be performed to set a base line value for each of the plurality of signal strength thresholds. Alternatively, the computing device may query a material setting or perform a location lookup from a prior use of the second device 150 in the same area. The specific values of the signal strength thresholds are application dependent and are based on factors that include, but are not limited to, the size of the working field 135 and/or the size of the operational path 125 of the first device 105 and the thickness of the barrier 130.

The alignment indicators 170, 175 assist an operator 140 with placement of the second device 150 relative to first device 105, since the barrier 130 may impair placement of the second device 150 based on visual cues alone. In one example, the alignment indicators 170, 175 include a plurality of LEDs that turn on in succession as signal strength of the first device 105 received by the second device 150 increases and exceeds one or more signal strength thresholds and that turn off in succession as the signal strength decreases and falls below one or more signal strength thresholds. In another example, the alignment indicators 170, 175 are a multicolored LED that displays as red when a signal strength of the first device 105 received by the second device 150 is below a low signal strength threshold, displays as yellow when the signal strength is above the low signal strength threshold and below a high signal strength threshold and displays as green when the signal strength is above the high signal strength threshold. In yet a further example, the alignment indicators 170, 175 are a light that blinks at different rates based on the signal strength of the first device 105 received by the second device 150, such that the light blinks faster as the signal strength increases and exceeds one or more signal strength thresholds. In alternative examples, the alignment indicators 170, 175 may include an electronic display or auditory feedback.

The computing device 190 contains hardware and software that are configured to automatically move the second device 150 in response to a determination by the computing device 190 that a signal received from the first device has a signal strength that is lower than a predetermined signal strength threshold. As described above, the first device 105 continuously emits a pilot signal via the receiver 110. The second device 150 receives the pilot signal and the computing device 190 constantly determines the strength of the pilot signal by measuring the power level of the pilot signal. As the distance between the first device 105 and the second device 150 increases, the signal strength of the pilot signal from the first device 105 decreases and vice versa. The computing device 190 also constantly compares the determined signal strength of the first device 105 to the predetermined signal strength threshold to determine whether to execute instructions causing the second device 150 to relocate. The specific value of the predetermined signal strength threshold is application dependent and based on factors that include, but are not limited to, the size of the working field 135 and/or the size of the operational path 125 of the first device 105 and the thickness of the barrier 130. In one example, the predetermined threshold is set based upon a signal strength of the first device 105 that indicates a desired proximity of the working field 135 of the first device 105 to the second device 150. As one illustration, when an operator 140 moves the first device 105 to another section of the barrier 130 such that the working field 135 of the first device 105 is not aligned with the proximity sensor 160 of the second device 150, then the second device 150 will detect this movement based on a decreased signal strength from the first device 105 that is less than the predetermined signal strength threshold. The computing device 190 may then execute instructions causing an electric motor of the second device 150 to activate and drive wheels, rollers or other ambulatory mechanisms coupled to the second device such that the second device 150 moves to a new position along the barrier 130 to realign with the first device 105. And once the second device 150 determines the signal strength from the first device 105 that exceeds the predetermined signal strength threshold, the computing device 190 may execute instructions causing the electric motor of the second device 150 to deactivate such that movement stops. In a further optional example, the second device 150 is configured to move along a guide-rail or a track 180 disposed along the length of the barrier 130 to facilitate alignment of the second device 150 relative to the first device 105.

In one optional example, the first device 105 has a computing device 198 that has the same form and attributes as that of computing device 190 described with respect to FIG. 10 below. The computing device 198 is communicatively coupled to the receiver 110, the first alert indicator 115, the override switch 120, the alignment indicators 170 and the second alert indicator 185. The computing device 198 is directly wired to components of the first device 105, including the receiver 110, the first alert indicator 115, the override switch 120, the alignment indicator 170 and the second alert indicator 185. In another example, the computing device 198 is wirelessly connected to the receiver 110, the first alert indicator 115, the override switch 120, the alignment indicator 170 and the second alert indicator 185.

Optionally, a second alert indicator 185 is coupled to the first device 105 and configured to activate in response to a determination that a signal of the second device 150 failed to be detected for a predetermined amount of time. In operation, the computing device 198 receives signals from the transmitter 155 of the second device 150 to determine signal strength for detection of the second device 150. The second device 150 continuously emits a pilot signal via the transmitter 155. The first device 105 receives the pilot signal and the computing device 198 constantly determines the strength of the pilot signal by measuring the power level of the pilot signal from the second device 150 and determines whether the signal strength has a non-zero value. If the measured signal strength is determined to have a zero value, this constitutes a failure to detect a signal of the second device 150. A failure to detect a signal from the second device 150 may be an indication of a dead battery in the second device 150 or that the second device 150 was inadvertently moved away from the working field 135 of the first device 105. In an alternative example, the first alert indicator 115 of the first device 105 could be configured to issue one type of alert in response to the second device 150 detecting an object 145 and to issue a second type of alert in response to a failure to detect a signal from the second device 150 after a predetermined amount of time (e.g., a watchdog timer).

Optionally, the system 100 includes a plurality of second devices 150, like those shown in FIGS. 1-2, each having a proximity sensor 160 and a transmitter 155 that is configured for communication with the proximity sensor 160. The plurality of second devices 150 are configured to send at least one wireless signal to the transmitter 155 of the first device 105 to activate one of the first alert indicator 115 or the override switch 120 in response to at least one of the plurality of second devices 150 detecting the object 145 within in the sensor zone 161 of the at least one of the plurality of second devices 150. The plurality of second devices 150 are further configured to be arranged in a non-line-of-sight position relative to the first device 105 such that the first device 105 and the plurality of second devices 150 are arranged on opposite sides of the barrier 130. For example, the plurality of second devices 150 may be arranged along the length or perimeter of the barrier 130 in a spaced apart manner. This example has the advantage of permitting an operator 140 of the first device 105 to move along the length of the barrier 130 without moving or realigning a single second device 150 with the working field 135 of the first device 105.

In other optional examples, the system 100 further includes a plurality of first devices 105, like those shown in FIGS. 1-2, each having a receiver 110 and at least one of a first alert indicator 115 and an override switch 120. Each of the plurality of first devices 105 may be in communication with one or more second devices 105 to permit multiple operators 140 to work on the barrier 130.

Figure 3:
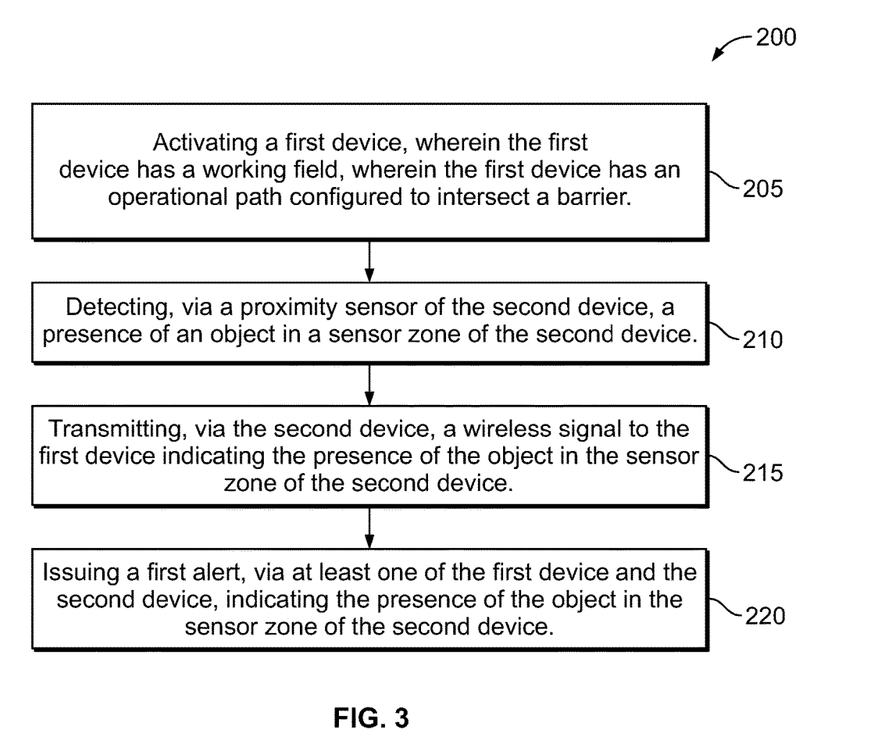
FIG. 3 is a flow diagram of a method, according to one example implementation.

FIG. 3 shows a flowchart of an example method 200 for increasing situational awareness for an operator 140 and an object 145 approaching a working field 135 of a first device 105, according to an example implementation. Method 200 shown in FIG. 3 presents an example of a method that could be used with the system 100, for example. Further, devices or systems may be used or configured to perform logical functions presented in FIG. 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 205-285. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of the present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 3, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Referring now to FIG. 3, a method 200 is illustrated using the system of FIGS. 1-2. Method 200 includes, at block 205, activating the first device 105, where the first device 105 has a working field 135 and has an operational path 125 configured to intersect a barrier 130. At block 210, the second device 150 detects, via a proximity sensor 160 of the second device 150, a presence of an object 145 in a sensor zone 161 of the second device 150. Then, at block 215, a wireless signal is transmitted, via the second device 150, to the first device 105 indicating the presence of the object 145 in the sensor zone 161 of the second device 150. And, at block 220, a first alert is issued, via at least one of the first device 105 and the second device 150, that indicates the presence of the object 145 in the sensor zone 161 of the second device 150. In an optional example, the second device 150 may receive a wireless signal from the first device 105 upon activation of the first device 105 as an initializing step. Performing an initialization step may permit the second device 150 to power the sensor 160 when the first device 105 is active and thereby conserve battery life of the second device 150.

In one example, issuing the first alert includes at least one of activating a feedback mode of either the first device 105 or second device 150 or disabling at least one operative function of the first device 105. In a further example, the feedback mode may include issuing a visual alert, an audible alert, or a tactile alert. In operation, when an object 145 is detected in the sensor zone 161, activating a feedback mode of the first device 105 or second device 150 may help avoid contact between the object 145 and the first device 105. In another optional example, detecting, via the proximity sensor 160 of the second device 150, the presence of the object 145 in the sensor zone 161 of the second device 150 includes detecting the presence of the object 145 in the working field 135 of the first device 105, and issuing the first alert includes disabling at least one operative function of the first device 105. In operation, once an object 145 is detected in the working field 135 of the first device 105 activating a feedback mode of the first device 105 and the second device 150 may not provide enough advance warning to an operator 140 or object 145 to avoid contact between the first device 105 and the object 145. Thus, disabling an operative function of the first device 105, such as drilling, sawing or emission of a laser or flame, may further reduce any injury or damage to the object 145 and help avoid contact between the first device 105 and the object 145.

Figure 4:
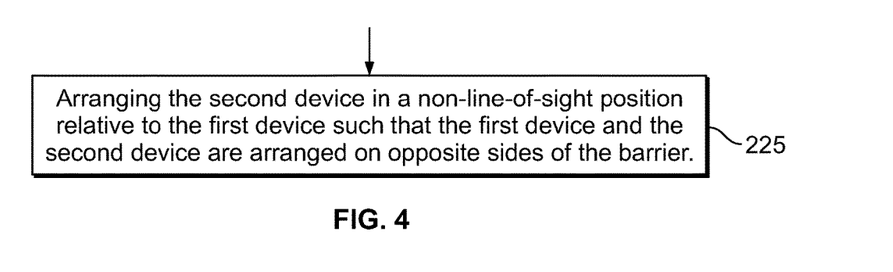
FIG. 4 shows a flowchart of an example method for use with the method shown in FIG. 3, according to an example implementation.

In one example, shown in FIG. 4 at block 225, method 200 includes arranging the second device 150 in a non-line-of-sight position relative to the first device 105 such that the first device 105 and the second device 150 are arranged on opposite sides 131, 132 of the barrier 130. This arrangement permits increased situational awareness for one or both of an operator 140 of the first device 105 and an object 145 detected by the second device 150.

Figure 5:
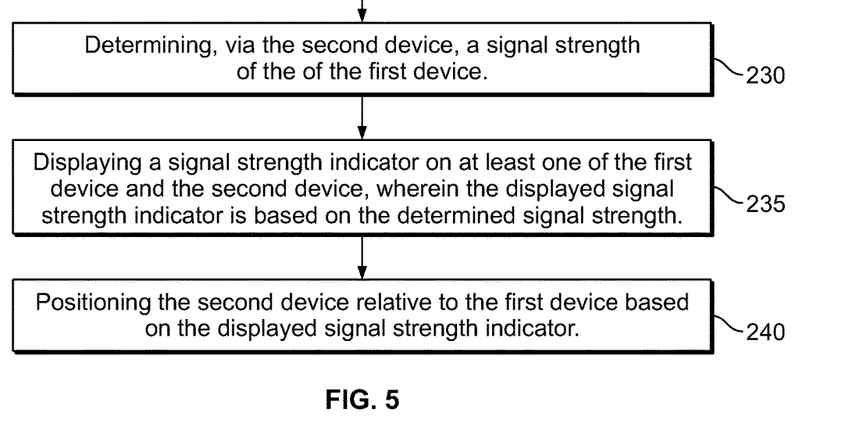
FIG. 5 shows a flowchart of another example method for use with the method shown in FIG. 3, according to an example implementation.

In one optional example, shown in FIG. 5, method 200 includes, at block 230, determining, via the second device 150, a signal strength of the first device 105. In operation, the receiver 110 of the first device 105 is a transceiver that continuously emits a pilot signal. The transmitter 155 of the second device 150 is a transceiver that receives the pilot signal and the computing device 190 constantly determines the strength of the pilot signal by measuring the power level of the pilot signal. The computing device 190 also constantly compares the determined signal strength to a plurality of signal strength thresholds to adjust the alignment indicator 170, 175. The specific values of the signal strength thresholds are application dependent and are based on factors that include, but are not limited to, the size of the working field 135 and/or the size of the operational path 125 of the first device 105 and the thickness of the barrier 130. Next, at block 235, a signal strength indicator is displayed on at least one of the first device 105 and the second device 150. The displayed signal strength indicator is based on the determined signal strength and the comparison to the plurality of signal strength thresholds. In some examples, the signal strength indicator has the form of the alignment indicator 170 discussed above with respect to system 100. And then, at block 240, the second device 150 is positioned relative to the first device 105 based on the displayed signal strength indicator. Accordingly, the signal strength indicator improves the alignment of the second device 150 with the first device 105, when, for example, the second device 150 is arranged in a non-line-of-sight position relative to the first device 105.

Figure 6:
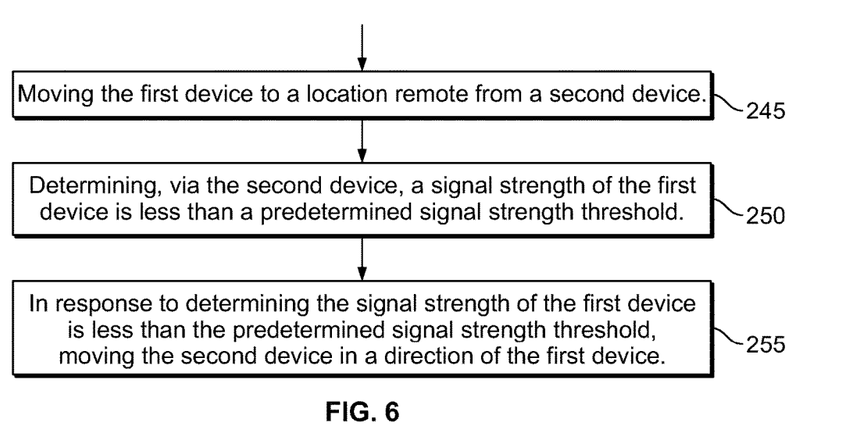
FIG. 6 shows a flowchart of an example method for use with the method shown in FIG. 3, according to an example implementation.
Figure 7:
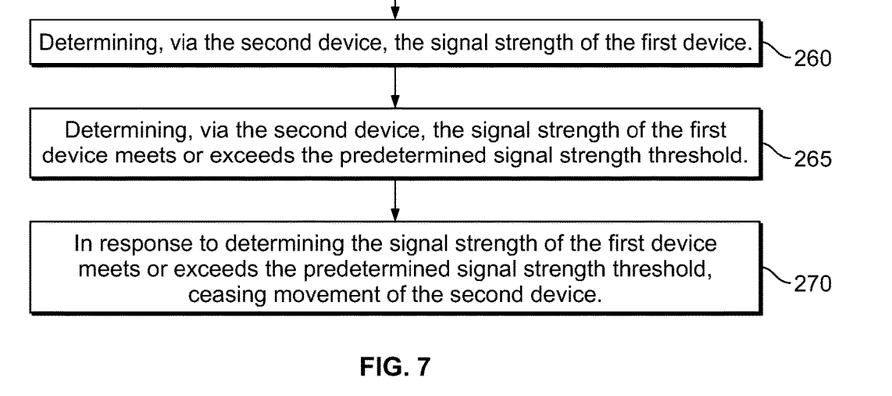
FIG. 7 shows a flowchart of another example method for use with the method shown in FIG. 3, according to an example implementation.

For another optional example, shown in FIG. 6, method 200 includes, at block 245, moving the first device 105 to a location remote from the second device 150. Then, at block 250, the second device 150 determines that a signal strength of the first device 105 is less than a predetermined signal strength threshold. As described above, the receiver 110 of the first device 105 is a transceiver that continuously emits a pilot signal. The transmitter 155 of the second device 150 is a transceiver that receives the pilot signal and the computing device 190 constantly determines the strength of the pilot signal by measuring the power level of the pilot signal. As the distance between the first device 105 and the second device 150 increases, the signal strength of the pilot signal from the first device 105 decreases and vice versa. The computing device 190 also constantly compares the determined signal strength of the first device 105 to the predetermined signal strength threshold to determine whether to execute instructions causing the second device 150 to relocate. The specific value of the predetermined signal strength threshold is application dependent and based on factors that include, but are not limited to, the size of the working field 135 and/or the size of the operational path 125 of the first device 105 and the thickness of the barrier 130. And at block 255, in response to determining the signal strength of the first device 105 is less than the predetermined signal strength threshold, moving the second device 150 in a direction of the first device 105. For example, in one implementation, a plurality of sensors capable of detecting signal strength may be placed in a spaced apart arrangement along a predetermined direction of travel. In an alternative example implementation, small advancements of the proximity sensor platform are made and the signal strength of the first device 105 is monitored during the advancements to determine the location of the first device 105 and to determine the direction of motion to relocate the second device 150. As discussed above with respect to system 100, when an operator 140 moves the first device 105 to another section of the barrier 130 such that the working field 135 of the first device 105 is outside the range of the proximity sensor 160 of the second device 150, then the second device 150 will detect this movement based on a decreased signal strength from the first device 105 that is less than the predetermined signal strength threshold. For example, the computing device 190 may execute instructions causing an electric motor of the second device 150 to activate and drive wheels, rollers or other ambulatory mechanisms coupled to the second device such that movement is effected. In a further optional example, moving the second device 150 in the direction of the first device 105 includes the second device 150 automatically moving along a guide-rail or a track 180 in response to sensor feedback detecting motion of the first device 105. In this example, the second device 150 may include additional proximity sensors that have sensor zones arranged facing potential directions of movement of the second device 150 to avoid contact with an object 145. In yet another optional example, shown in FIG. 7, the method 200 includes, at block 260, determining, via the second device 150, the signal strength of the first device 105. Then, at block 265, the second device 150 determines that the signal strength of the first device 105 meets the predetermined signal strength threshold and, at block 270, in response to determining the signal strength of the first device 105 meets or exceeds the predetermined signal strength threshold, movement of the second device 150 ceases. For example, the computing device 190 may execute instructions causing an electric motor of the second device 150 to deactivate such that movement stops. The operations, functions, or actions as illustrated by blocks 245-270 permit automatic movement of the second device 150 without intervention by the operator 140 of the first device 105.

Figure 8:
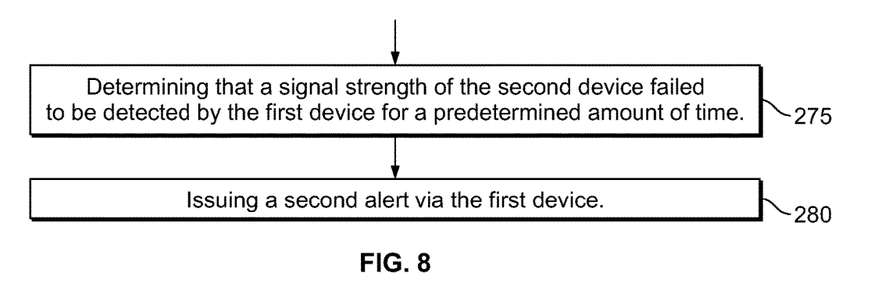
FIG. 8 shows a flowchart of an example method for use with the method shown in FIG. 3, according to an example implementation.

In one optional example, shown in FIG. 8, method 200 includes, at block 275, determining that a signal strength of the second device 150 failed to be detected by the first device 105 for a predetermined amount of time. In this example, the first device 105 has a computing device 198 that has the same form and attributes as that of computing device 190 described with respect to FIG. 10 below. The computing device 198 receives signals from the transmitter 155 of the second device 150 to determine signal strength for detection of the second device 150. In this example, the second device 150 continuously emits a pilot signal via the transmitter 155. The first device 105 receives the pilot signal and the computing device 198 constantly determines the strength of the pilot signal by measuring the power level of the pilot signal from the second device 150 and determines whether the signal strength has a non-zero value. If the measured signal strength is determined to have a zero value for a predetermined amount of time, this constitutes a failure to detect a signal of the second device 150. And, at block 280, a second alert is issued via the first device 105. In operation, a failure to detect a signal from the second device 150 may be an indication of a dead battery in the second device 150 or that the second device 150 was inadvertently moved away from the working field 135 of the first device 105. The second alert may take any of the forms and have any of the effects of the first alert discussed in detail above.

Figure 9:
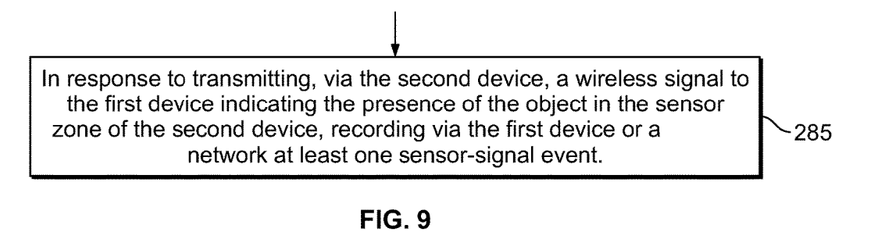
FIG. 9 shows a flowchart of another example method for use with the method shown in FIG. 3, according to an example implementation.

In another optional example, shown in FIG. 9, method 200 includes, at block 285, in response to detecting, via the proximity sensor 160 of the second device 150, the presence of the object 145 in the sensor zone 161 of the second device 150, recording via a computing device 190 of the second device 150 or a network 199 at least one sensor-signal event. The sensor-signal event information may include, but is not limited to, a time-stamp, an identification of the specific proximity sensor 160 that detected the object 145 and a location of the proximity sensor 160 at the time of detection. In another example, the sensor-signal event information may further include an indication as to whether the object 145 was detected in the working field 135 of the first device 105.

FIG. 10 is a block diagram illustrating an example of the computing device 190, according to an example implementation. The computing device 190 may be used to perform functions of methods shown in FIGS. 3-9. The computing device 190 has a processor(s) 191, and also a communication interface 192, data storage 193, an output interface 194, and a display 195 each connected to a communication bus 196. The computing device 190 may also include hardware to enable communication within the computing device 190 and between the computing device 190 and other devices (not shown). The hardware may include transmitters, receivers, and antennas, for example.

The communication interface 192 may be a wireless interface and/or one or more wired interfaces that allow for both short-range communication and long-range communication to one or more networks 199 or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wired interfaces may include Ethernet interface, a Universal Serial Bus (USB) interface, or similar interface to communicate via a wire, a twisted pair of wires, a coaxial cable, an optical link, a fiber-optic link, or other physical connection to a network 199. Thus, the communication interface 192 may be configured to receive input data from one or more devices, and may also be configured to send output data to other devices.

The communication interface 192 may also include a user-input device, such as a keyboard or mouse, for example.

The data storage 193 may include or take the form of one or more computer-readable storage media that can be read or accessed by the processor(s) 191. The computer-readable storage media can include volatile and/or non-volatile storage components, such as optical, magnetic, organic or other memory or disc storage, which can be integrated in whole or in part with the processor(s) 191. The data storage 193 is considered non-transitory computer readable media. In some examples, the data storage 193 can be implemented using a single physical device (e.g., one optical, magnetic, organic or other memory or disc storage unit), while in other examples, the data storage 193 can be implemented using two or more physical devices.

The data storage 193 thus is a non-transitory computer readable storage medium, and executable instructions 197 are stored thereon. The instructions 197 include computer executable code. When the instructions 197 are executed by the processor(s) 191, the processor(s) 191 are caused to perform functions. Such functions include receiving signals from the proximity sensor 160 and determining whether to issue a first alert to activate one or more of the first alert indicators 115, 165 and the override switch 120, as well as receiving signals from the receiver 110 of the first device 105 and determining signal strength of the first device 105 for alignment with the second device 150.

The processor(s) 191 may be a general-purpose processor or a special purpose processor (e.g., digital signal processors, application specific integrated circuits, etc.). The processor(s) 191 may receive inputs from the communication interface 192, and process the inputs to generate outputs that are stored in the data storage 193 and output to the display 195. The processor(s) 191 can be configured to execute the executable instructions 197 (e.g., computer-readable program instructions) that are stored in the data storage 193 and are executable to provide the functionality of the computing device 190 described herein.

The output interface 194 outputs information to the display 195 or to other components as well. Thus, the output interface 194 may be similar to the communication interface 192 and can be a wireless interface (e.g., transmitter) or a wired interface as well. The output interface 194 may send information about detection of an object 145 to the first alert indicators 115, 165 and/or to the override switch 120, for example, and send information about signal strength of the first device 105 to the alignment indicator 175 of the second device 150, for example.

The computing device 190 shown in FIG. 10 may also be representative of the computing device 198, for example.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

We claim:

1. A method, comprising:
activating a first device, wherein the first device has a working field, wherein the first device has an operational path configured to intersect a barrier;
detecting, via a proximity sensor of a second device, a presence of an object in a sensor zone of the second device;
transmitting, via the second device, a wireless signal to the first device indicating the presence of the object in the sensor zone of the second device; and
issuing a first alert, via at least one of the first device and the second device, indicating the presence of the object in the sensor zone of the second device.

2. The method of claim 1, wherein detecting, via the proximity sensor of the second device, the presence of the object in the sensor zone of the second device comprises detecting the presence of the object in the working field of the first device, and wherein issuing the first alert comprises disabling at least one operative function of the first device.

3. The method of claim 1, further comprising:
arranging the second device in a non-line-of-sight position relative to the first device such that the first device and the second device are arranged on opposite sides of the barrier.

4. The method of claim 1, further comprising:
determining, via the second device, a signal strength of the first device;
displaying a signal strength indicator on at least one of the first device and the second device, wherein the displayed signal strength indicator is based on the determined signal strength; and
positioning the second device relative to the first device based on the displayed signal strength indicator.

5. The method of claim 4, further comprising:
moving the first device to a location remote from the second device;
determining, via the second device, a signal strength of the first device is less than a predetermined signal strength threshold; and
in response to determining the signal strength of the first device is less than the predetermined signal strength threshold, moving the second device in a direction of the first device.

6. The method of claim 5, wherein moving the second device in the direction of the first device comprises the second device automatically moving along a guide-rail or a track in response to sensor feedback.

7. The method of claim 5, further comprising:
determining, via the second device, the signal strength of the first device;
determining, via the second device, the signal strength of the first device meets or exceeds the predetermined signal strength threshold; and
in response to determining the signal strength of the first device meets or exceeds the predetermined signal strength threshold, ceasing movement of the second device.

8. The method of claim 1, further comprising
determining that a signal strength of the second device failed to be detected by the first device for a predetermined amount of time; and
issuing a second alert via the first device.

9. The method of claim 1, wherein issuing the first alert comprises issuing a visual alert, an audible alert, or a tactile alert.

10. The method of claim 1, wherein issuing the first alert comprises at least one of activating a feedback mode of either the first device or the second device or disabling at least one operative function of the first device.

11. The method of claim 1, further comprising:
in response to detecting, via the proximity sensor of the second device, the presence of the object in the sensor zone of the second device, recording via a computing device of the second device or a network at least one sensor-signal event.

12. A system, comprising:
a first device having a receiver and at least one of a first alert indicator and an override switch; and
at least one second device having a transmitter and a proximity sensor, the proximity sensor configured for communication with the transmitter of the second device, the second device configured to send at least one wireless signal to the receiver of the first device to activate one of the first alert indicator or the override switch in response to the proximity sensor detecting an object within a sensor zone of the second device.

13. The system of claim 12, wherein the second device is arranged in a non-line-of-sight position relative to the first device such that the first device and the second device are arranged on opposite sides of a barrier.

14. The system of claim 12, wherein at least one of the first device and the second device has an alignment indicator configured to indicate a signal strength of the first device received by the second device.

15. The system of claim 14, wherein the alignment indicator comprises a plurality of LEDs, a multicolored LED or a light that blinks at different rates based on the signal strength of the first device.

16. The system of claim 12, wherein the proximity sensor comprises at least one of an optical sensor, an infrared sensor, an ultrasonic sensor, a tactile sensor, a contact sensor, a capacitive sensor, a laser-based sensor, a through-beam sensor, a camera-based sensor and a motion sensor.

17. The system of claim 12, wherein the first alert indicator comprises a controller configured to cause at least one of visual, audible, or tactile feedback.

18. The system of claim 12, wherein the second device further comprises a computing device configured to automatically move the second device in response to a determination by the computing device that a signal received from the first device has a signal strength that is lower than a predetermined signal strength threshold.

19. The system of claim 12, further comprising:
a second alert indicator coupled to the first device and configured to activate in response to a determination that a signal strength of the second device failed to be detected for a predetermined amount of time.

20. A system, comprising:
a first device having a receiver and at least one of a first alert indicator and an override switch; and
a plurality of second devices each having a proximity sensor and a transmitter that is configured for communication with the proximity sensor, the plurality of second devices configured to send at least one wireless signal to the receiver of the first device to activate one of the first alert indicator or the override switch in response to at least one of the plurality of second devices detecting an object in a sensor zone of the at least one of the plurality of second devices, the plurality of second devices are configured to be arranged in a non-line-of-sight position relative to the first device such that the first device and the plurality of second devices are arranged on opposite sides of a barrier.

* * * * *